H. Turner.
Spring-Chain.
No 75814. Patented Mar. 24, 1868.
Fig. 1
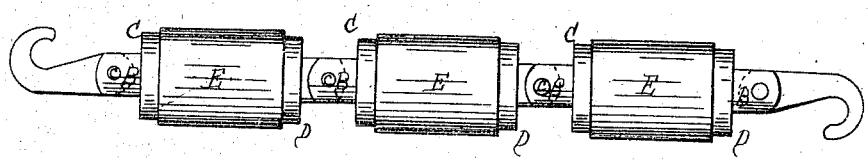
Fig. 2
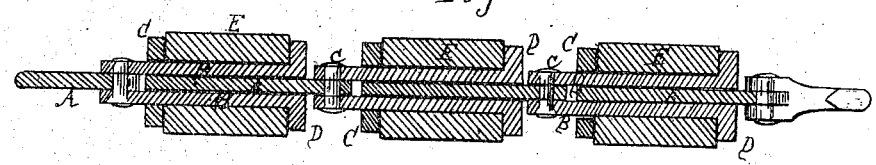
Fig. 4.     Fig. 3.     Fig. 5.
 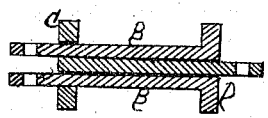 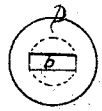
Witnesses
Inventor
Henry Turner
by his attorney

United States Patent Office.

HENRY TURNER, OF BOSTON, MASSACHUSETTS, ASSIGNOR TO HIMSELF AND MELLEN BRAY, OF SAME PLACE.

*Letters Patent No. 75,814, dated March 24, 1868.*

IMPROVEMENT IN SPRING-CHAIN.

*The Schedule referred to in these Letters Patent and making part of the same.*

TO WHOM IT MAY CONCERN:

Be it known that I, HENRY TURNER, of Boston, in the county of Suffolk, and State of Massachusetts, have invented certain new and useful Improvements in Springs; and I hereby declare the following to be a full, clear, and exact description of the same, reference being had to the accompanying drawings, in which—

Figure 1 is an elevation, and

Figure 2 a longitudinal central section of a series of springs jointed together.

Figure 3 is a like section of the links of which each spring is partly composed, with the surrounding rubber or elastic body removed.

Figures 4 and 5 are end views of the said links.

The object of my invention is to produce a spring especially adapted for use as a traction-spring; that is to say, in all cases where a spring is required which, while calculated to sustain a great amount of strain, will at the same time yield somewhat to any sudden tug or pull, so as to prevent the spring itself, as well as the parts it connects, from being injured.

When a number of such springs are hinged or pivoted one to another, a chain will be formed, the links of which, instead of being rigid and unyielding, are elastic and extensible. A chain of this kind may be adapted to many uses. For instance, it may be employed to form harness-traces, or for analogous purposes, so as to prevent the jerks and sudden strains which often injure both the horse, as well as the vehicle to which he is attached. It may also be used in the rigging of vessels, to lessen the sudden tug or strain incident to the shifting of the sails, and may be applied to many other uses which need not be mentioned.

To enable others skilled in the art to understand and use my invention, I will now proceed to describe the manner in which the same is or may be carried into effect, by reference to the accompanying drawings.

The spring is composed of the metal links A B, provided with heads or disks mounted on their ends C D, and the rubber or other suitable elastic and compressible body, E. The rubber E, in the drawing, has a cylindrical form, and is mounted upon the links A B, which lie side by side, and carry the disks C D, between which the same is held. In order to render the disks capable of moving towards and away from one another, so as to compress the spring with greater or less force, as required, each link passes through a slot formed in the head or disk of the other link. The end of the rod or link A passes through and slides in the slot $b$ of the disk D, and the link B passes through the slot $a$ in the disk C. By pulling the ends of the rods, which project beyond the disks, in opposite directions, it will be seen that the disks are thereby caused to approach one another, each disk sliding upon the stem or link of the other.

In order to give greater strength to the spring, and to prevent it from being twisted or bent laterally, one of the links, B, may be bifurcated or forked, so as to receive between its sides the other link, A. The arrangement of the openings or slots in the heads of the links, when this tongue-and-groove formation is employed, is shown in figs. 4 and 5, the openings $a\ a$, to receive the forked link B, being on each side of the centre of the disk or head C, while the opening $b$, in the head D, for the reception of the end of the link A, is in the centre of the head. It is manifest, however, without further prolonging this explanation, that the arrangement of these links may be considerably varied, without departing from the principle of my invention.

In figs. 1 and 2 is represented a series of springs pivoted together, so as to form a chain. The method of uniting them is simple, the projecting end of the link A, of one spring, being inserted between the ends of the forked link B of the next succeeding spring, where it is held by means of a pin, $c$, by which the two are pivoted or hinged together. It will be understood that, instead of the rubber E, any other suitable elastic body, or metal spring, capable of being compressed, can be employed. I prefer, however, the form and constituent parts of the spring shown in the drawings, as it is thereby made light and cheap, as well as effective.

When a chain of this kind is used for traction, or other purposes above named, it yields to a sudden jerk, or to a strain or draught, until the resistance it offers (which constantly increases with the extension of the links, and the consequent compression of the elastic body held by them,) is in excess of the power applied, or of the resistance of the object to be either held or moved. At this point it ceases to yield, and becomes, to all intents and purposes, like an ordinary chain or rope.

Having described my invention, and the manner in which the same is or may be carried into effect, what I claim, and desire to secure by Letters Patent, is—

1. The combination, in a spring such as described, of the bifurcated or forked link B, and its slotted head, with the link A, and its slotted head, under the arrangement and for operation as herein described, so that the end of each link shall pass through and be capable of sliding in the head of the other link, as and for the purposes set forth.

2. The combination, with the sliding links, and their slotted or perforated heads, arranged as described, of the rubber cylinder or other elastic body, mounted upon said links, and interposed between their heads, as and for the purposes herein shown and specified.

3. The combination of two or more springs, such as described, in the manner herein shown and set forth, so as to form an elastic and extensible chain.

In testimony whereof, I have signed my name to this specification before two subscribing witnesses.

HENRY TURNER.

Witnesses:
    ISAIAH KNOWLES, Jr.,
    S. Z. BOWMAN.